United States Patent [19]
Deets

[11] 4,080,404
[45] * Mar. 21, 1978

[54] FLAME RETARDANT STYRENIC MOLDING COMPOSITIONS

[75] Inventor: Gary L. Deets, Springfield, Mass.

[73] Assignee: Monsanto Company, St. Louis, Mo.

[*] Notice: The portion of the term of this patent subsequent to Sep. 2, 1992, has been disclaimed.

[21] Appl. No.: 675,846

[22] Filed: Apr. 12, 1976

[51] Int. Cl.² ............ C08L 51/00; C08L 53/00
[52] U.S. Cl. ............ 260/876 R; 260/DIG. 24
[58] Field of Search ....... 260/876 R, 876 B, DIG. 24; 106/15 FP

[56] References Cited
U.S. PATENT DOCUMENTS

| | | | |
|---|---|---|---|
| 3,830,889 | 8/1974 | Deets et al. | 260/876 R |
| 3,903,037 | 9/1975 | Deets | 260/32.6 A |

OTHER PUBLICATIONS

Lyons, The Chemistry and Uses of Fire Retardants (Wiley–Interscience 1970), pp. 20, 21, 250, 312, 331–332, 411–412.

Primary Examiner—Thomas De Benedictis, Sr.
Attorney, Agent, or Firm—W. J. Farrington; J. C. Logomasini; S. M. Tarter

[57] ABSTRACT

Disclosed herein are polyblend molding compositions which comprise (A) poly(styrene/acrylonitrile/methylmethacrylate) matrix polymer; (B) polychloroprene rubber which is grafted with monomers of the type used to prepare the matrix; (C) a metal oxide; and (D) smoke suppressants. Specimens molded from these polyblends have a UL-94 rating of at least V-1 and a smoke level of less than 360 $D_m$ Flaming as measured using the NBS smoke test.

10 Claims, 1 Drawing Figure

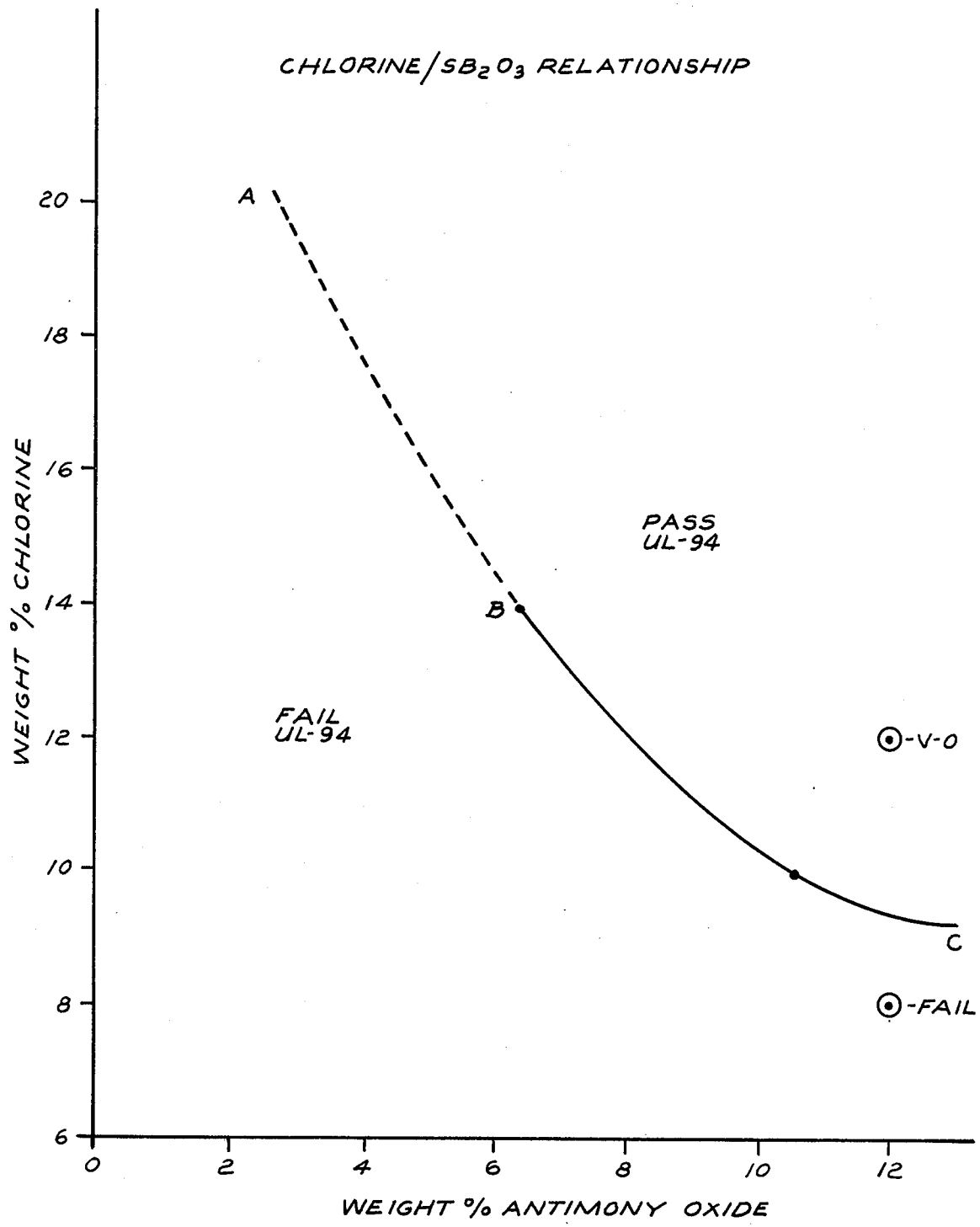

FLAME RETARDANT STYRENIC MOLDING COMPOSITIONS

BACKGROUND OF THE INVENTION

1. Field of the Invention

Disclosed herein are polyblend molding compositions which exhibit smoke evolution levels of less than 360 $D_m$ (Flaming) and UL-94 ratings of at least V-1. The polyblends comprise (A) poly(styrene/acrylonitrile/methylmethacrylate) matrix polymer; (B) polychloroprene rubber which is grafted with monomers of the type used to prepare the matrix; (C) a metal oxide; and (D) smoke suppressants.

2. Description of the Prior Art

Fire retardant polymers based on styrene, acrylonitrile and polychloroprene are well known in the art as is evidenced by U.S. Pat. Nos. 3,830,889, 3,903,037 and 3,929,722. The same art also teaches that these compositions may also contain up to about 25 percent by weight of additional monomers such as methylmethacrylate. These polymers described in these references have good flame retardant properties and fulfill a need in the art. A further need exists to reduce the amount of smoke evolved by these polymers under flaming conditions.

SUMMARY OF THE INVENTION

The above needs in the prior art are met by the polyblend compositions of the present invention which comprises:

(A) from 10 to 75 percent by weight based on the total weight of the polyblend of a matrix polymer which comprises the interpolymerization product of;
  (1) from 20 to 40 percent by weight of a styrene type monomer;
  (2) from 20 to 40 percent by weight of a nitrile type monomer; and
  (3) from 40 to 60 percent by weight of methylmethacrylate; wherein the weight percents of (1), (2) and (3) are based on the total weight of the matrix polymer with the proviso that the total weight of the styrene and nitrile type monomers is equal to or less than 60 percent by weight and the amount of methylmethacrylate monomer is at least 40 percent by weight;

(B) from 20 to 40 percent by weight based on the total weight of the polyblend of a polychloroprene rubber component which is grafted with from 10 to 100 parts of monomers per hundred parts of rubber; wherein the monomers are of the type used to perpare the matrix polymer;

(C) from 3 to 15 percent by weight based on the total weight of the polyblend of a metal oxide;

(D) from 2 to 25 percent by weight based on the total weight of the polyblend of a smoke suppressant selected from the group consisting of dawsonite, [Na Al CO$_3$ (OH)$_2$], magnesium carbonate, ferric oxalate, zinc borate, zinc acetate and combinations of zinc oxide and magnesium oxide, wherein the ratio of zinc oxide to magnesium oxide is in the range of from 30/70 to 70/30;

(E) from 0 to 10 percent by weight based on the total weight of the polyblend of a halogen fire retardant additive; provided that the total amount of halogen in the polyblend is at least 9 percent by weight.

DESCRIPTION OF THE DRAWING

FIG. 1 shows the relationship between the halogen content of the polyblend and the amount of antimony oxide required to obtain a rating of at least V-1 in the UL-94 test. The portion of the figure above the Curve ABC represents those compositions which will result in a V-1 or V-0 rating in the UL-94 test while that portion below the Curve ABC represents those compositions which will fail the UL-94 test. Generally at higher halogen levels less antimony oxide is required to obtain a V-1 rating. The broken line AB in FIG. 1 is an extrapolation.

DESCRIPTION OF THE PREFERRED EMBODIMENTS

THE MATRIX POLYMER

The matrix polymers used in the present invention are polymers of a styrene type monomer, a nitrile monomer and methylmethacrylate. Styrene type monomers include styrene, alpha-methyl styrene, and the like; nitrile monomers include acrylonitrile, methacrylonitrile, and the like. The amount of matrix polymer used is in the range of from 10 to 75 percent by weight, preferably 60 to 75 percent by weight, based on the total weight of the polyblend. Preferably, the styrene type monomer is present in amounts of from 25 to 40 precent by weight and the methylmethacrylate is present in amounts of from 40 to 55 percent by weight.

THE CHLOROPRENE RUBBER COMPONENT

The polychloroprene rubber component used in the present invention is polychloroprene or a copolymer of chloroprene and at least one other monomer such as butadiene, acrylonitrile, methacrylonitrile, styrene, ring substituted halostyrene, alpha-halostryene, ring substituted alkylstyrene, alpha-alkyl-styrene. The amount of comonomer used is in the range of 0 to 20 percent based on the weight of polychloroprene rubber copolymer.

Chloroprene rubbers are commercially available as solid rubbers, rubber latices (also referred to as emulsions) and solutions. The preferred polychloroprene rubbers used in the present invention are those in solid form or in latex form. The chloroprene rubber used is crosslinked either before or during processing in order to maintain its particulate nature. The most preferred chloroprene rubbers used in latex or emulsion graft systems are crosslinked to a medium to high gel content and have a Mooney viscosity above at least about 200 (MS 2½ min. 212° F.). These rubber latices are sold by E. I. duPont de Nemours and Company as Neoprene Latices, e.g., Neoprene 842A. Neoprene Latices available from the E. I. duPont de Nemours and Company, Wilmington, Delaware are described in the reference "Neoprene Latex", by J. C. Carl, published by duPont in 1962. In general, the Neoprene Latices have a rubber solids content of about 34 to 60 percent, a pH of about 9 to 13, latex specific gravity of about 1.10 to 1.15, rubber specific gravity of 1.23 to 1.42, latex viscosity of 16 to 400 cps. (Brookfield viscosity) and the latices are stabilized by anionic or cationic emulsifiers. The rubber particle size distribution of such latices can be varied so as to give the selected weight average particle size range desired and disclosed in this invention. Other polychloroprene latices are also commercially available from the Petro-Tex Chemical Corporation of Houston, Texas.

Ungrafted polychloroprene rubber can be used in the present invention. However, polychloroprene rubber which has been grafted with a polymer composition similar to that used for the matrix polymer is preferred. The grafted polychloroprene rubber provides better impact strength and fire retardancy because the graft improves the degree of dispersion of the rubber in the polyblend.

The solid chloroprene rubbers are conventionally grafted by dissolving or dispersing the rubber in the monomers to be grafted onto the rubber.

The chloroprene rubbers in latex or emulsion form are readily grafted by dispersing the monomers in the latex or emulsion and then grafting the monomers onto the rubber using conventional polymerization methods.

The percent of monomer grafted onto the polychloroprene rubber is a controlled amount and can be varied from about 10 to 100 percent depending on the weight average particle size of the rubber and the properties desired. The percent graft is defined as the weight percent of monomers grafted onto the rubber particle, based on the weight of the rubber, e.g., 100 grams of rubber grafted with 100 grams of monomer has 100 percent of grafted monomers.

The weight average particle size of the rubber is selected to provide a balance of good physical properties such as impact and gloss. The polychloroprene rubber latices used have a rubber particle size (before grafting) of from about 0.01 to 0.60 micron with about 0.05 to 0.35 micron being most preferred. The most preferred size is 0.05 to 0.35 micron in order to give the polyblend desirable impact strength and high gloss. These rubber particles (0.05 to 0.35 micron) are grafted in a preferred range of 10 to 100 percent by weight with 45 to 65 percent being most preferred to insure compatibility and good gloss.

The polyblends of the present invention require a halogen content of at least 9 percent, preferably 10 percent, by weight, based on the weight of the polyblend in order to qualify for a V-1 fire retardancy rating. In order to obtain this amount of halogen, without using additional halogen additives, from about 25 to 40 percent by weight of a polychloroprene rubber component (calculated as ungrafted rubber) based on the total weight of the polyblend is used. When the polychloroprene rubber copolymers are used, the weight of the polychloroprene rubber copolymer is selected to provide 25 to 40 percent by weight of chloroprene rubber units in the polyblend. The above values correspond to about 27 to 80 percent by weight of grafted polychloroprene rubber considering that the graft level can be from about 10 percent to 100 percent by weight of the polychloroprene rubber. The amount of chloroprene rubber used can be lowered to 20 percent provided that an auxiliary halogen additive is used to raise the halogen level to at least 9 percent and preferably 10 percent. Suitable auxiliary halogen additives are described below.

Small amounts, i.e., up to 10 percent by weight, preferably up to 5 percent by weight of the polychloroprene rubber component may be replaced with other rubbers conventionally used to reinforce polymeric materials. Examples of these rubbers include polybutadiene, polyisoprene, rubbery polyacrylates and ethylene vinyl acetate copolymers, ethylene-propylene rubbers, etc. Other suitable rubbers will be obvious to those skilled in the art upon reading the present specification. When substituting these rubbers for the polychloroprene rubber component used in the present invention, care should be taken with the type and amount of rubber so as not to unduly increase the flammability and/or the smoke evolution properties of the polyblends of the present invention.

THE METAL OXIDES

The present invention contains from 3 to 15 percent, preferably 6 to 12 percent by weight, based on the weight of the polyblend, of at least one metal oxide. Preferred additives are metal oxides such as $Sb_2O_3$, $Bi_2O_3$, $MoO_3$, $SnO_2$, $WO_3$, and the like. The preferred additive is antimony oxide. As FIG. 1 illustrates, less antimony oxide is required with increasing amounts of chlorine in order to pass the UL-94 test.

SMOKE SUPPRESSANTS

The smoke suppressants used in the present invention are dawsonite, [Na Al $CO_3(OH)_2$], magnesium carbonate, ferric oxalate, zinc borate, zinc acetate and combinations of zinc oxide and magnesium oxide, wherein the ratio of zinc oxide to magnesium oxide is in the range of from 30/70 to 70/30. The amount of smoke suppressant used in this invention will be in the range of from 3 to 25 percent by weight, preferably from 5 to 20 percent by weight based on the total weight of the polyblend composition.

The preferred smoke suppressant system is a combination of zinc oxide and magnesium oxide wherein the ratio of zinc oxide to magnesium oxide is in the range of from 70/30 to 30/70. Zinc acetate is also preferred.

HALOGEN ADDITIVES

The polyblends of the present invention may also be formulated with additives which provide additional halogen content to the polymer composition. These halogenated fire retardant additives are generally well known in the art. The preferred additives are those which contain one or more bromine atoms attached to an aromatic nucleus. One such class of these compounds may be represented by the following general formula:

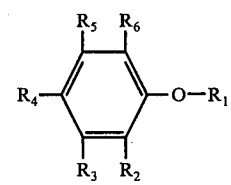

in which $R_1$ is an aromatic group which may be brominated and/or chlorinated or a straight chain or branched alkyl group containing from 2 to 12 carbon atoms and may contain an OH group, and $R_2$ to $R_6$ stand for a member of the group consisting of hydrogen, chlorine and bromine, said ether containing at least three bromine atoms attached to an aromatic group.

Examples of suitable diaromatic ethers containing bromine attached to the nucleus are tribromodiphenylether, tetrabromodiphenylether, pentabromodiphenylether, hexabromodiphenylether, tribromochlorodiphenylether, tribromodichlorodiphenylether, tribromotrichlorodiphenylether, tetrabromodichlorodiphenylether and decabromodiphenyl ether. The halogen atoms of these diaromatic ethers may be distributed in any arrangement on the aromatic rings.

Examples of suitable aromatic-aliphatic ethers are the 2-ethylhexyl- n-octyl, nonyl, butyl-, dodecyl- and 2,3- dioxopropyl ethers of tribromophenyl, tribromochlorophenyl and tribromodichlorophenyl. The most preferred compound is decabromodiphenyl ether. Other aromatic bromine compounds are described in U.S. Pat. Nos. 3,833,538, 3,849,369; British Pat. No. 1,372,120 and West German Patent Publication Nos. 2,328,517, 2,328,520 and 2,328,535, which are incorporated herein by reference. Other suitable aromatic bromine compounds are well known to those skilled in the art or will become obvious upon reading the present specification.

The amount of halogenated fire retardant additives is in the range of from 0 to 10 percent by weight, preferably 2 to 5 percent by weight in order to provide additional halogen to the composition. This additional halogen is required when the chloroprene content is less than 25 percent by weight and when the amount of styrene in the matrix polymer is less than 25 percent by weight at chloroprene levels in the range of from 20 to 25 percent by weight.

TEST PROCEDURES

Underwriter's Labortory UL-94 (1)

Fire retardant properties are measured using the "Test For Flammability for Plastic Materials - UL-94", Sept. 17, 1973. The test is carried out on test specimens $6 \times \frac{1}{2} \times \frac{1}{8}$ inches. When other sample thicknesses are used the stated thickness is given.

The test specimen is supported from the upper end, with longest dimension vertical, by a clamp on a ring stand so that the lower end of the specimen is three-eighth inch above the top of the burner tube. The burner is then placed remote from sample, ignited and adjusted to produce a blue flame three-fourth inch in height.

The test flame is placed centrally under the lower end of the test specimen and allowed to remain for 10 seconds. The test flame is then withdrawn, and the duration of flaming or glowing combustion of the specimen noted. If flaming or glowing combustion of the specimen ceased within 30 seconds after removal of the test flame, the test flame is again placed under the specimen (1) The numerical UL-94 ratings and smoke ratings reported herein are not intended to reflect hazards presented by the presently claimed polyblends or any other materials under actual fire conditions. for 10 seconds immediately after flaming combustion of the specimen stops. The test flame is again withdrawn, and the duration of flaming combustion of the specimen noted.

If the specimen drops flaming particles or droplets while burning in this test, these drippings shall be allowed to fall onto a horizontal layer of cotton fibers (untreated surgical cotton) placed one foot below the test specimen. Significantly flaming particles are considered to be those capable of igniting the cotton fibers.

The duration of flaming or glowing combustion of vertical specimens after application of the test flame, average of five specimens (10 flame applications) shall not exceed 25 seconds (maximum not more than 30 seconds), and the portion of the specimen outside the clamp shall not be completely burned in the test.

Materials which comply with the above requirements and do not drip any flaming particles or droplets during the burning test will classify as V-1 according to the nomenclature used in the UL-94 test.

Materials which comply with the above requirements, but drip flaming particles or droplets which ignite cotton fibers will classify as V-2 according to the nomenclature used in the UL-94 test.

Class V-0 is given to materials wherein the duration of flaming averages less than 5 seconds under the conditions above with no ignition burning more than 10 seconds.

SMOKE EVOLUTION TESTS

The method used for measuring smoke evolution is that described in D. Gross, J. J. Loftus, and A. F. Robertson, "Method for Measuring Smoke from Burning Materials", Symposium on Fire Test Methods — Restraint and Smoke 1966, ASTM STP 422, Am. Soc. Testing Mats., 1967, p. 166.

The following examples are set forth in illustration of the present invention and are not to be construed as a limitation thereof. Unless otherwise indicated all parts and percentages are by weight.

EXAMPLE 1

PREPARATION OF MATRIX POLYMER

The matrix polymers are prepared by any of the conventional polymerization methods. This example illustrates one such method using emulsion polymerization techniques. Charge:

100 parts monomer
  1 part sodium lauryl sulfate
  2 parts Dowfax 2A-1 (surfactant)
  0.5 part n-dodecyl mercaptan
  1 part $K_2S_2O_8$
  0.04 part $NaH SO_3$
  0.00033 part $Fe_2(SO_4)_3$
  water to obtain 25 to 35 percent solids The soap and ferric sulfate and water are added initially to a 3 liter round bottom glass reactor. The soap solution is heated to 50°–75° C. with nitrogen purging. After temperature is reached 5 percent of the monomer (nitrogen purged) is added at the proper composition to yield instantaneous polymer of desired composition. The remaining monomer is added continuously over a 4-hour period. At the end of the monomer addition period the reaction is cooled quickly.

EXAMPLE 2

PREPARATION OF GRAFTED RUBBER

This example illustrates grafting of polychloroprene rubber for use in the present invention. Charge for Graft Formulation:

100 parts rubber
  100 parts monomer
  1 part sodium lauryl sulfate
  1 part Dowfax 2A-1 (surfactant)
  2 parts $K_2S_2O_8$
  0.08 part $NaH SO_3$
  0.00066 part $Fe_2(SO_4)_3$
  0 – 2 parts t-butylperoxypivalate (initiator)
  0.5 part n-dodecyl mercaptan
  2.6 parts acetic anhydride
  water to obtain 25 percent solids At least 0.5 part each of the sodium lauryl sulfate and Dowfax 2A-1 surfactant per 100 parts of rubber are added initially followed by the acetic anhydride (4% in water), ferric sulfate solution and initial monomer (5% of monomer) is added at the proper composition to yield instantaneous polymer of desired composition. The reactants are then heated to 75°–85° C. under nitrogen and t-butylperoxypivalate, initial $K_2S_2O_8$ and $NaH SO_3$ are added. The remaining monomer is added continuously over a 4 hour period. The sodium lauryl sulfate, Dowfax 2A-1 surfactant, soap and initiators may be added in one shot or continuously. At the end of the polymerization reaction the batch is cooled quickly.

EXAMPLES 3 to 8

The following examples illustrate the smoke evolution of various polyblend compositions. The polyblends are prepared from various styrene/acrylonitrile/methylmethacrylate (S/AN/MMA) matrix polymers which are formulated with 9 percent by weight of antimony oxide and 20 percent by weight (ungrafted basis) of polychloroprene rubber. No smoke suppressant is used. The matrix and graft polymers are prepared according to the general procedures outlined in Examples 1 and 2 above. The smoke test results for Examples 3 to 8 are tabulated in Table I below.

TABLE I
SUMMARY OF SMOKE TESTS FOR EXAMPLES 3 to 8

| Example | Polymer Composition S/AN/MMA | $D_m$ Flaming |
|---|---|---|
| Control | 70/30/0 | 500 |
| 3 | 50/30/20 | 500 |
| 4 | 40/20/40 | 410 |
| 5 | 25/35/40 | 410 |
| 6 | 30/20/50 | 390 |
| 7 | 20/30/50 | 380 |
| 8 | 20/40/40 | 350 |

Referring to Table I above, the Control and Example 3, which are outside of the scope of the present invention, have the lowest MMA contents (0 and 20 percent, respectively) and the highest smoke evolution. Increasing the MMA content to at least 40 weight percent lowers smoke evolution. Increasing the acrlonitrile level to 40 percent while reducing the styrene level to 20 also lowers the amount of smoke evolved. In this regard, it should be noted that at levels of up to 30 percent by weight, acrylonitrile behaves like styrene in regard to the amount of smoke evolved. A maximum in the amount of smoke evolved versus percent acrylonitrile is reached around 30 weight percent of acrylonitrile. At higher amounts of acrylonitrile, less smoke is evolved presumably due to char formation due to the acrylonitrile. In Example 8, a smoke rating of 350 is obtained without the use of a smoke suppressant.

EXAMPLES 9 to 16

Examples 9 to 16 illustrate the polyblends of the present invention which are formulated with a smoke suppressant which is either dawsonite (Examples 10 to 12) or magnesium carbonate (Examples 13 to 16). The compositions tested and the test results are tabulated in Table II below.

TABLE II
SUMMARY OF EXAMPLES 9 to 16

| Example | Matrix % by weight S/AN/MMA(1) | % P.C. | % $Sb_2O_3$ | % Dawsonite | % $MgCO_3$ | Test Results UL-94 | $D_m$ |
|---|---|---|---|---|---|---|---|
| 9 (Control) | 25/35/40 | 25 | 10.5 | None | None | V-O | 420 |
| 10 | 25/35/40 | 23.8 | 10 | 5 | None | Fail | 350 |
| 11 | 25/35/40 | 22.5 | 9.5 | 10 | None | Fail | 310 |
| 12 | 25/35/40 | 25 | 10.5 | 10 | None | V-1 | 340 |
| 13 | 25/35/40 | 25 | 10.5 | None | 10 | V-O | 320 |
| 14 | 40/20/40 | 25 | 10.5 | None | 10 | V-O | 360 |
| 15 | 30/20/50 | 25 | 10.5 | None | 10 | V-O | 330 |
| 16 | 20/40/40 | 25 | 10.5 | None | 10 | Fail | 250 |

(1)Percent by weight for matrix polymer is based on total weight of matrix. Percent P.C. is weight percent of polychloroprene (calculated as ungrafted rubber) based on the total weight of the polyblend. Percent of other additives based on the total weight of the polyblend.

Referring to Table II above, a reduction in smoke evolution is obtained when using either dawsonite or magnesium carbonate. Examples 10 and 11, which fail the UL-94 test, show the need for using an auxiliary halogen source when using less than 25 percent polychloroprene (ungrafted basis) in the polyblend in order to obtain a UL-94 rating of at least V-1. Failure in the UL-94 test is also due in part to the dawsonite which may be reacting with some of the chlorine liberrated by the chloroprene rubber thereby making the chlorine unavailable to retard the flames.

Example 16 illustrates the fire retardant properties are harder to obtain as the amount of styrene approaches the 15 percent level. The reason for this is that relatively speaking, it is easier to impart flame retardant properties to the styrene compositions than to the acrylonitrile and methylmethacrylate compositions. Consequently, an auxiliary halogen source is required when the amount of styrene is less than 25 percent at polychloroprene levels in the range of 20 to 25 percent by weight.

EXAMPLES 17 to 34

The following examples illustrate the use of an additional halogen fire retardant additive and various smoke suppressant additives. The matrix polymer (20/40/40 S/AN/MMA), polychloroprene (25% by weight — ungrafted basis) and antimony oxide (10.5%) used in Example 16 above are used here. The additional halogen source is decabromodiphenylether which is available commercially as FR 300 BA from Dow. Examples 19 and 21 contain 5 percent by weight, based on the total weight of the polyblend, of the decabromodiphenyl ether. All of the other examples contain 2.5 percent. The types and amounts of smoke suppressants used are tablulated in Table III below along with the test results.

TABLE III
SUMMARY OF EXAMPLES 17 to 34

| Example | Smoke Suppressant | % by weight(1) | $D_m$ | UL-94 |
|---|---|---|---|---|
| 17 | $MoO_3$ | 10.5 | 270 | Fail |
| 18 | ZnO | 10 | 250 | Fail |
| 19 | ZnO | 10 | 280 | Fail |
| 20 | ZnO | 5 | 300 | Fail |
| 21 | ZnO | 5 | 445 | V-O |
| 22 | $MoO_3$ (2) | 5 | 445 | V-O |
| 23 | $Ng(BO_2)_2$ | 10 | 425 | V-O |
| 24 | CuS | 10 | 490 | — |
| 25 | $Cu_2S$ | 10 | 425 | — |
| 26 | $Cu_2N$ | 10 | 390 | — |
| 27 | $TiB_2$ | 10 | 390 | — |
| 28 | 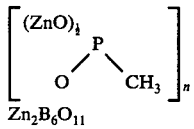 | | | |
| 29 | $Zn_2B_6O_{11}$ | 10 | 360 | V-O |
| 30 | MgO | 10 | 355 | V-O |

TABLE III-continued
SUMMARY OF EXAMPLES 17 to 34

| Example | Smoke Suppressant | % by weight(1) | $D_m$ | UL-94 |
|---|---|---|---|---|
| 31 | $MgCO_3$ | 10 | 290 | V-O |
| 32 | $Fe_2(C_2O_4)_3$ | 10 | 350 | V-O |
| 33 | Zinc Acetate | 10 | 310 | V-O |
| 34 | ZnO/MgO | 2.5/2.5 | 315 | V-O |

(1)Percent by weight of smoke suppressant is based on total weight of polyblend.
(2)Example 17 contains no antimony oxide while Example 22 contains 5 percent by weight of antimony oxide as compared to 10.5 percent for other examples in Table III.

Referring to Table III above, Examples 17 to 28, inclusive, fail to meet the smoke evolution (less than 360 $D_m$) or the UL-94 (at least V-1) requirements of the present invention. These examples further show the need for specific polyblend compositions in order to meet the required smoke and UL-94 levels.

Examples 29 to 34 illustrate polyblends which do meet the required smoke and UL-94 levels. Example 34 is of special interest in that when using a combination of zinc oxide and magnesium oxide, good results are obtained at a loading of only 5 percent by weight versus 10 percent for Examples 29 to 33.

EXAMPLES 35 to 41

These examples further illustrate other compositional variations that are possible within the scope of the present invention, and some of the physical properties of these compositions. In each example a styrene-acrylonitrile-methylmethacrylate (S/AN/MMA) matrix polymer is blended with a grafted chloroprene rubber. The polymer superstrate which is grafted on the rubber, has the same composition as the matrix polymer except where noted. In each example, the polyblend contains 25 percent by weight of chloroprene rubber (ungrafted basis) and 10.5 percent by weight of antimony oxide, both percents based on the total weight of the polyblend.

The Izod Test (ASTM-D-256-Method A) is used to measure impact strength while ASTM-D-648 is used to measure the Heat Distortion Temperature Under Load (HDTUL). The compositions tested and the test results are tabulated in Table IV below.

TABLE IV
SUMMARY OF EXAMPLES 35 to 41

| Example | Matrix Composition S/AN/MMA | % $MgCO_2$ | UL-94 | Dm | Izod (3) | HDTUL (4) |
|---|---|---|---|---|---|---|
| 35 | 25/35/40 | None | V-1 | 450 | 1.7 | 172 |
| 36 | 25/35/40 | 5 | V-0 | 410 | 1.0 | 175 |
| 37 | 25/35/40 | 10 | V-0 | 320 | 1.0 | 176 |
| 38(1) | 40/20/40 | — | V-1 | 415 | 1.3 | 174 |
| 39(1) | 40/20/40 | 10 | V-0 | 360 | 0.7 | 177 |
| 40 | 20/40/40 | 10 | Fail | 250 | 1.0 | 181 |
| 41(2) | 20/40/40 | 10 | V-0 | 290 | 1.3 | 174 |

(1)Polymer superstrate grafted onto rubber is 25/35/40 S/AN/MMA.
(2)Polyblend contains 2.5% by weight of decabromodiphenyl oxide.
(3)¼ inch × ⅛ inch injection molded bars.
(4)¼ inch × ⅛ inch injection molded unannealed bars (264 psi) except for Example 41 which was compression molded.

Referring to Table IV above, Examples 40 and 41 illustrate the need for an auxiliary halogen additive when the amount of styrene in the matrix polymer is 20 percent by weight and the amount of chloroprene rubber is in the range of from 20 to 25 percent by weight. Examples 35, 36 and 38 show the need for a smoke suppressant when using the specific matrix composition shown. Further, the magnesium carbonate which is used in these examples must be present in amounts greater than 5 percent by weight in order to reduce the smoke values to less than 360 $D_m$.

EXAMPLES 42 to 52

The following examples further illustrate the criticality of the compositional ranges used in the present invention and the need to avoid additional comonomers which would contribute to smoke evolution and/or flammability. In each example the polychloroprene rubber component is grafted with styrene/acrylonitrile/methylmethacrylate mixture which has approximately the same composition as the matrix polymer.

The polyblends are prepared and tested as indicated above. The compositions tested and the test results are tubulated in Table V below.

TABLE V
SUMMARY OF EXAMPLES 42 to 52

| Ex. | Matrix S/AN/MMA/ Comonomer | Comonomer | $Sb_2O_3$hd | % P.C. | Dm | UL-94 |
|---|---|---|---|---|---|---|
| 42 | 25/40/35/0 | None | 9 | 20 | 400 | Fail |
| 43 | 25/40/35/0 | None | 10.5 | 25 | 420 | V-0 |
| 44 | 25/40/35/0 | None | 9 | 20 | 440 | Fail |
| 45 | 25/40/25/10 | tribromo-neopentyl-methacrylate | 9 | 20 | 485 | V-0 |
| 46 | 25/40/25/10 | " | 5 | 20 | 495 | V-1 |
| 47 | 25/35/40/0 | None | 10.5 | 25 | 430 | V-0 |
| 48 | 15/35/40/10 | chlorostyrene | 9 | 20 | 465 | Fail |
| 49 | 15/35/40/10 | bromosytrene | 9 | 20 | 525 | V-1 |
| 50 | 25/35/30/10 | 2-chloro methacrylate | 9 | 20 | 350 | Fail |
| 51 | 22.5/31.5/36/10 | bis-(2-chloroethyl)vinyl phosphonate | 9 | 20 | 420 | Fail |
| 52 | 22.5/31.5/36/10 | diethylvinyl-phosphonate | 9 | 20 | 420 | Fail |

Referring to Table V above, Examples 42 and 44, which only contain 20 percent by weight of chloroprene rubber units and no additional halogen source, fail the UL-94 test. Examples 42 to 44, inclusive, which contain less than 40 percent by weight methylmethacrylate, have a $D_m$ rating greater than 360. Examples 48 to 51, which contain a halogenated comonomer in the matrix polymer, fail to exhibit the desired smoke level or else fail the UL-94 test.

The polyblends of the present invention are useful for preparing a wide variety of molded objects such as radio and television cabinets, appliance housings, parts and components for vehicles, furniture and other related items.

Polyblends of the present invention may be further modified with conventional additives and adjuvants such as fillers, plasticizers, U.V. stabilizers, heat stabilizers, antioxidants, etc. Care should be taken when formulating or compounding the polyblends of the present invention so as not to adversely effect the flammability and/or smoke evolution properties of the polyblends of the present invention.

What is claimed is:

1. A polyblend composition comprising:
   (A) from 10 to 75 percent by weight based on the total weight of the polyblend of a matrix polymer which comprises the interpolymerization product of:
   (1) from 20 to 40 percent by weight of a monomer selected from the group consisting of styrene and alpha methyl-styrene;
   (2) from 20 to 40 percent by weight of a nitrile type monomer; and (3) from 40 to 60 percent by weight of methylmethacrylate; wherein the weight percents of (1), (2) and (3) are based on the total weight of the matrix polymer with the proviso that the total weight of the styrene and nitrile type monomers is equal to or less than 60 percent by weight and the amount of methylmethacrylate monomer is at least 40 percent by weight;

(B) from 20 to 40 percent by weight based on the total weight of the polyblend of a polychloroprene rubber component which is grafted with from 10 to 100 parts of monomers per hundred parts of rubber; wherein the monomers are of the type used to prepare the matrix polymer;

(C) from 3 to 15 percent by weight based on the total weight of the polyblend of a metal oxide;

(D) from 2 to 25 percent by weight based on the total weight of the polyblend of a smoke suppressant selected from the group consisting of dawsonite, [Na Al $CO_3(OH)_2$], magnesium carbonate, ferric oxalate, zinc borate, zinc acetate and combinations of zinc oxide and magnesium oxide, wherein the ratio of zinc oxide to magnesium oxide is in the range of from 30/70 to 70/30;

(E) from 0 to 10 percent by weight based on the total weight of the polyblend of a halogen fire retardant additive; provided that the total amount of halogen in the polyblend is at least 9 percent by weight.

2. A polyblend as in claim 1 which contains 60 to 75 percent by weight of the matrix polymer.

3. A polyblend as in claim 1 which contains from 25 to 40 percent by weight of a polychloroprene rubber component.

4. A polyblend as in claim 1 where the smoke suppressant is a combination of zinc oxide and magnesium oxide, wherein the ratio of zinc oxide to magnesium oxide is in the range of from 30/70 to 70/30.

5. A polyblend as in claim 1 which contains from 2 to 5 percent by weight of decabromodiphenyl ether.

6. A polyblend composition comprising:

(A) from 60 to 75 percent by weight based on the total weight of the polyblend of a matrix polymer which comprises the interpolymerization product of;

(1) from 25 to 40 percent by weight of a monomer selected from the group consisting of styrene and alpha methyl-styrene;

(2) from 20 to 40 percent by weight of a nitrile type monomer; and (3) from 40 to 55 percent by weight of methylmethacrylate; wherein the weight percents of (1), (2) and (3) are based on the total weight of the matrix polymer with the proviso that the total weight of the styrene and nitrile type monomers is equal to or less than 60 percent by weight and the amount of methylmethacrylate monomer is at least 40 percent by weight;

(B) from 25 to 40 percent by weight based on the total weight of the polyblend of a polychloroprene rubber component which is grafted with from 10 to 100 parts of monomers per hundred parts of rubber; wherein the monomers are of the type used to prepare the matrix polymer;

(C) from 6 to 12 percent by weight based on the total weight of the polyblend of a metal oxide;

(D) from 2 to 25 percent by weight based on the total weight of the polyblend of a smoke suppressant selected from the group consisting of zinc acetate and combinations of zinc oxide and magnesium oxide, wherein the ratio of zinc oxide to magnesium oxide is in the range of from 30/70 to 70/30;

(E) from 0 to 10 percent by weight based on the total weight of the polyblend of a halogen fire retardant additive; provided that the total amount of halogen in the polyblend is at least 9 percent by weight.

7. A polyblend as in claim 6 where the smoke suppressant is a combination of zinc oxide and magnesium oxide, wherein the ratio of zinc oxide to magnesium oxide is in the range of from 30/70 to 70/30.

8. A polyblend as in claim 6 which contains from 2 to 5 percent by weight of decabromodiphenyl ether.

9. Articles molded from the polyblend composition of claim 1.

10. Articles molded from the polyblend composition of claim 6.

* * * * *